(12) United States Patent
Kudli et al.

(10) Patent No.: US 11,954,929 B2
(45) Date of Patent: *Apr. 9, 2024

(54) FAILURE MODE DISCOVERY FOR MACHINE COMPONENTS

(71) Applicant: DIMAAG-AI, Inc., Fremont, CA (US)

(72) Inventors: Rajaram Kudli, Bengaluru (IN); Satish Padmanabhan, Sunnyvale, CA (US); Fuk Ho Pius Ng, Portland, OR (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,001

(22) Filed: Mar. 17, 2023

(65) Prior Publication Data

US 2024/0054800 A1    Feb. 15, 2024

Related U.S. Application Data

(63) Continuation of application No. 17/818,373, filed on Aug. 9, 2022, now Pat. No. 11,636,697.

(51) Int. Cl.
*G06V 30/19* (2022.01)
*G06F 16/35* (2019.01)
*G06V 30/182* (2022.01)

(52) U.S. Cl.
CPC ........ *G06V 30/19107* (2022.01); *G06F 16/35* (2019.01); *G06V 30/1823* (2022.01)

(58) Field of Classification Search
CPC .......... G06V 30/19107; G06V 30/1823; G06F 16/35
See application file for complete search history.

(56) References Cited

U.S. PATENT DOCUMENTS

| | | | |
|---|---|---|---|
| 8,005,771 | B2 | 8/2011 | Chen et al. |
| 11,636,697 | B1 | 4/2023 | Kudli |
| 2006/0074828 | A1 | 4/2006 | Heumann et al. |
| 2019/0095417 | A1* | 3/2019 | Xu .................. G06F 40/284 |
| 2020/0175360 | A1 | 6/2020 | Conti et al. |
| 2021/0365793 | A1 | 11/2021 | Surya et al. |

OTHER PUBLICATIONS

U.S. Appl. No. 17/818,373, Non Final Office Action dated Jan. 6, 2023, 6 pgs.
U.S. Appl. No. 17/818,373, Notice of Allowance dated Feb. 14, 2023, 12 pgs.
International Application Serial No. PCT/US23/64138, Written Opinion and Search Report dated Jul. 3, 2023, 9 pgs.

* cited by examiner

*Primary Examiner* — Wissam Rashid
(74) *Attorney, Agent, or Firm* — Polygon IP, LLP

(57) ABSTRACT

The failure modes of mechanical components may be determined based on text analysis. For example, a word embedding may be determined based on a plurality of text documents that include a plurality of maintenance records characterizing failure of mechanical components. A vector representation for a particular maintenance record may then be determined based on the word embedding. Based on the vector representation, the particular maintenance record may then be identified as belonging to a particular failure mode out of a set of possible failure modes.

31 Claims, 6 Drawing Sheets

FAILURE MODE DISCOVERY FOR MACHINE COMPONENTS

CROSS-REFERENCE TO RELATED APPLICATIONS

This application is a continuation of, and claims priority to, U.S. patent application Ser. No. 17/818,373 by Kudli et al., titled "FAILURE MODE DISCOVERY FOR MACHINE COMPONENTS", filed Aug. 9, 2022, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to modeling and prediction related to mechanical components and more specifically to the identification of failure modes related to mechanical components.

BACKGROUND

Mechanical components are subject to wear over time. For this reason, both individual mechanical components and machines that include multiple components occasionally fail or require maintenance. Machines tend to fail in particular ways. For example, when gas turbines fail, the failures tend to divide into erosion and abrasion, foreign object damage, corrosion, and fatigue. However, as machines and mechanical components increase in complexity, ascertaining the particular ways in which machines and mechanical components are most likely to fail can be come difficult, particularly in an industrial setting In an industrial setting, knowledge of the particular ways in which machines and mechanical components are most likely to fail can nevertheless be invaluable. First, by understanding failure modes, machines can be subject to scheduled maintenance to prevent many instances of failure. Second, a deeper understanding of failure modes can reduce costs, time, and risks associated with maintenance by allowing maintenance personnel to quickly identify and address problems. Third, a clear view of the ways in which machines and their components tend to fail can provide information useful for improving the manufacturing of machines and components, for instance by reducing weaknesses or avoiding unnecessary focus on areas unlikely to present problems. Accordingly, improved techniques for identifying machine failure modes in an automated fashion are desired.

OVERVIEW

According to various embodiments, systems, apparatus, methods and computer program products described herein facilitate the detection of failure modes for mechanical components. A word embedding may be determined based on a plurality of text documents including a plurality of maintenance records characterizing failure of mechanical components. A designated vector representation may be determined for a designated maintenance record. The designated vector representation may include a designated plurality of vectors determined based on the word embedding. The designated maintenance record may be identified as belonging to a designated failure mode of a plurality of failure modes based on the designated plurality of vectors. An indication of the designated failure mode may be stored on a storage device.

In some embodiments, a plurality of vector representations may be determined based on the word embedding. Each of the vector representations may include a respective plurality of vectors determined based on a respective one of the text documents. The plurality of failure modes may be identified by applying a clustering algorithm to the plurality of vector representations. Each of the plurality of failure modes may correspond with a respective cluster of a plurality of clusters determined by the clustering algorithm. Respective labels for the plurality of clusters may be determined based on statistical analysis of the plurality of vector representations. The statistical analysis may include determining a plurality of word frequencies. The word embedding may be determined at least in part based a predetermined data set identifying the plurality of failure modes. The word embedding may be a word2vec model.

BRIEF DESCRIPTION OF THE DRAWINGS

The included drawings are for illustrative purposes and serve only to provide examples of possible structures and operations for the disclosed inventive systems, apparatus, methods and computer program products for failure mode discovery via record data. These drawings in no way limit any changes in form and detail that may be made by one skilled in the art without departing from the spirit and scope of the disclosed implementations.

DETAILED DESCRIPTION

In many industries, such as those related to manufacturing, automotive, and consumer electronics, much of the information about the complaints, diagnosis, issues, prognosis, and remedies associated with scheduled and/or unscheduled maintenance is stored in unstructured or semi-structured maintenance records. For instance, maintenance records are commonly stored in a textual format. When using conventional techniques, this can present a serious roadblock in streamlining feedback to upstream and/or downstream business and/or engineering processes. For example, efforts such as preventive and/or predictive maintenance, improving maintenance schedules, reducing warranty costs, increasing customer service efficacy, and improving design research and development can be hindered by the lack of information about when and how machines and components tend to fail.

Techniques and mechanisms described herein provide for an automated framework for identifying and standardizing failure modes in mechanical components and machines by analyzing unstructured, semi-structured, and/or structured data. According to various embodiments, a domain-specific and potentially context-specific ontology may be constructed via a machine learning model such as deep-learning word-embedding. Textual information such as that included in maintenance records and other unstructured, semi-structured, or structured sources may then be vectorized using the constructed ontology. The resulting information may be clustered to identify failure modes using an unstructured machine learning process, and the identified failure modes may be automatically labeled. Such labeling may be based on the text information itself, based on external information such as industry-provided references, or based on a combination thereof.

Figure 1:
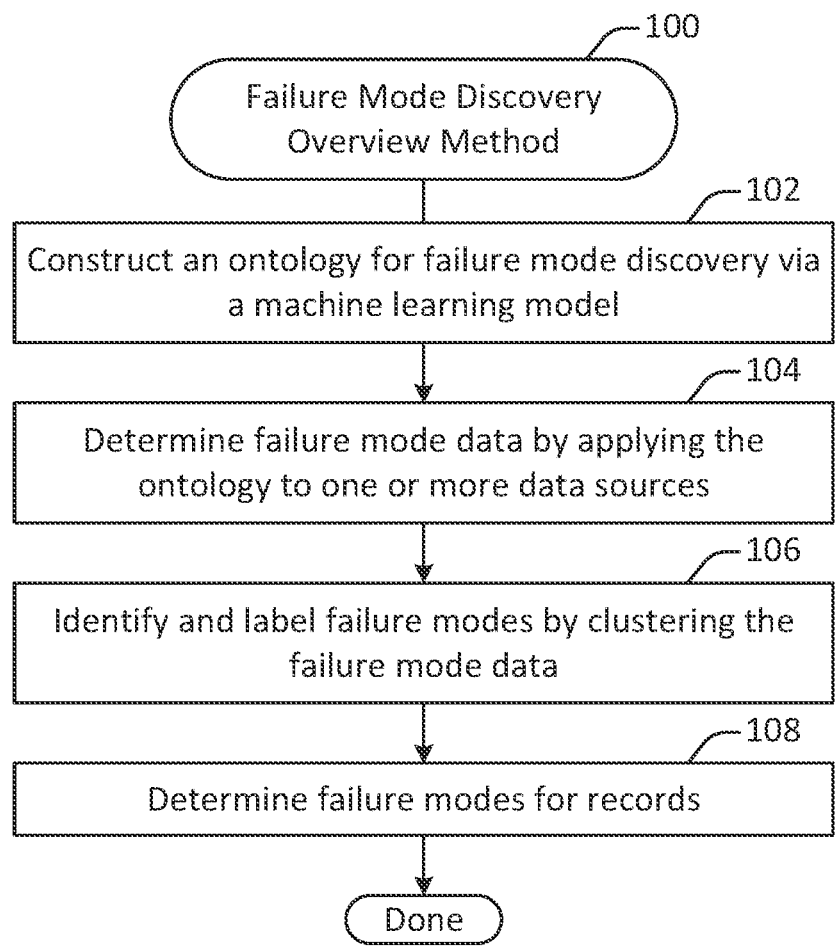
FIG. 1 illustrates an example of an overview method for failure mode discovery, performed in accordance with one or more embodiments.

FIG. 1 illustrates an example of an overview method 100 for failure mode discovery, performed in accordance with one or more embodiments. According to various embodiments, the method 100 may be performed on any suitable computing device to aggregate and analyze information from disparate sources to identify failure modes in one or more mechanical components or machines. The method 100 may be applied to determine failure modes for a particular machine or component. Alternatively, the method 100 may be applied to determine failure modes for a set of machines or components, such as machines or mechanical components operating in an industrial setting such as a factory.

An ontology for failure mode discovery is constructed via a machine learning model at 102. According to various embodiments, constructing an ontology for failure mode discovery may involve analyze textual data to identify words, phrases, and/or groups of words and/or phrases that indicate failure modes. For instance, mechanical component or machine manuals may be analyzed to identify problems that can arise. The ontology may be, for instance, a word2vec model that maps words in source documents to vectors in a multi-dimensional vector space. Additional details regarding the construction of an ontology for failure mode discovery are discussed with respect to the method 200 shown in FIG. 2.

Failure mode data is determined by applying the ontology to one or more data sources at 104. According to various embodiments, determining failure mode data may involve applying the ontology determined at 102 to analyze textual data for evidence of failure. For instance, maintenance records associated with scheduled and/or unscheduled maintenance may be analyzed to identify indicators of mechanical component or machine failure. Additional details regarding the determination of failure mode data are discussed with respect to the method 300 shown in FIG. 3.

Failure modes are identified and labeled at 106 by clustering the failure mode data at 106. According to various embodiments, determining the failure modes may involve identifying combinations of words and phrases that appear together. For example, a particular failure mode for a gas turbine engine may tend to include words and phrases such as "water", "corrosion", "rust", "air inlet", "compressor wash", "evaporative cooler carryover", "acid", and "fuel injector purging". Additional details regarding the determination of failure modes are discussed with respect to the method 400 shown in FIG. 4.

In some embodiments, determining labels for the identified failure modes may involve applying one or more machine learning models to the clustered data to identify appropriate labels. Such models may involve, for instance, identifying particularly common words or phrases within each cluster determined at 106. For instance, a particular failure mode for a gas turbine engine that includes words and phrases such as "water", "corrosion", "rust", "air inlet", "compressor wash", "evaporative cooler carryover", "acid", and "fuel injector purging" may be automatically labeled as "corrosion." Additional details regarding the determination of failure modes are discussed with respect to the method 400 shown in FIG. 4.

Failure modes are assigned to records at 108. According to various embodiments, assigning failure modes to records may involve determining for a given record which, if any, of the failure modes identified and labeled at 106 characterizes the record. Additional details regarding the assignation of failure modes to records are discussed with respect to the method 500 shown in FIG. 5.

Figure 2:
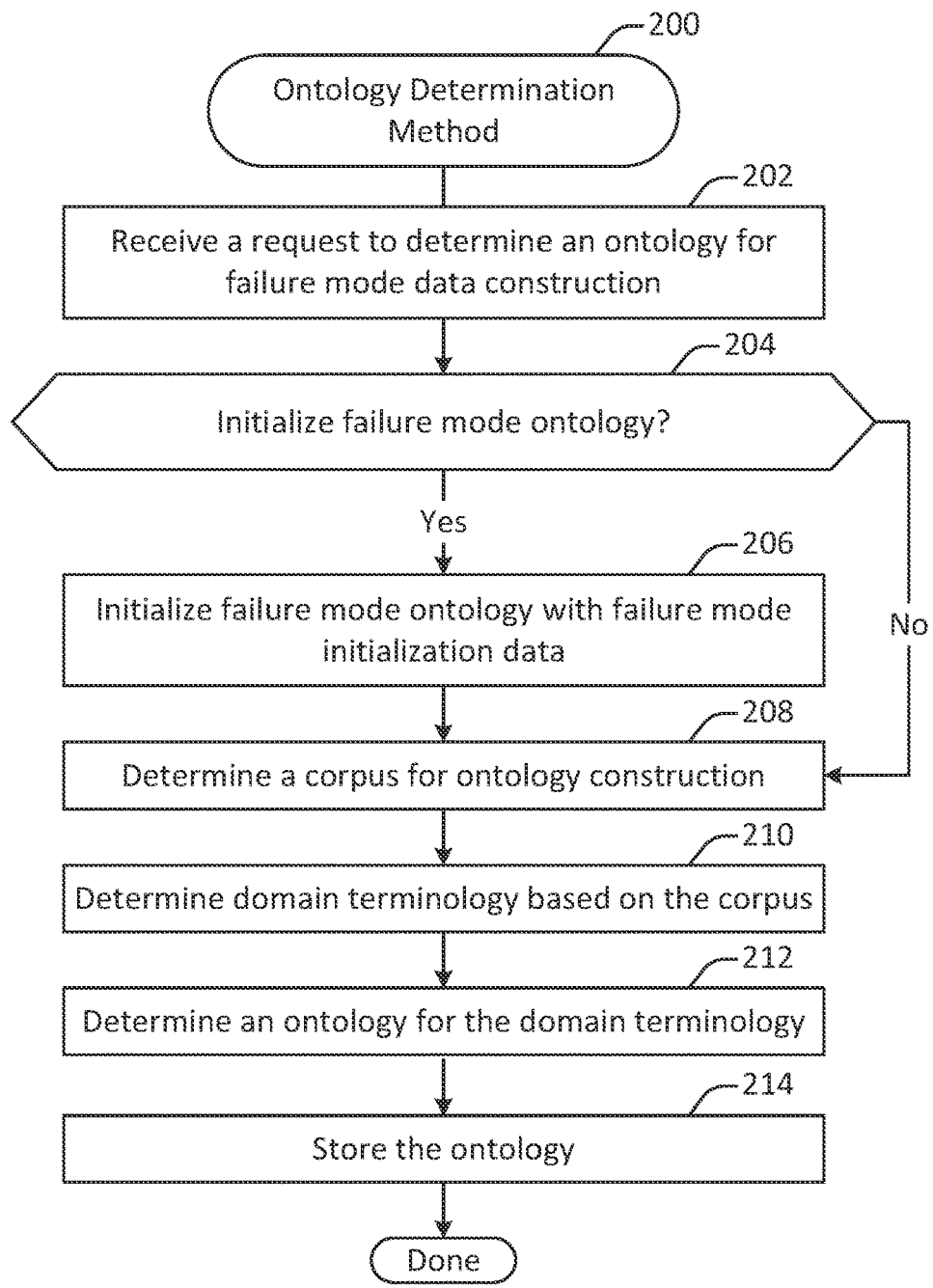
FIG. 2 illustrates an example of a method 200 for failure mode data construction, performed in accordance with one or more embodiments.

FIG. 2 illustrates an example of a method 200 for failure mode data construction, performed in accordance with one or more embodiments. The method 200 may be performed at any suitable computing device to analyze one or more unstructured, semi-structured, and/or structured data sources to identify words, phrases, and concepts suitable for use in determining failure modes associated with one or more mechanical components and/or machines.

A request to determine an ontology for failure mode construction is received at 202. In some implementations, the request may be generated as discussed with respect to operation 102 shown in FIG. 1. The request may be generated at least in part based on user input. For instance, an administrator may initiate a request to determine an ontology in a particular context. Alternatively, the request may be generated at least in part based on an automated process. For instance, an ontology may be periodically updated, for example when new data sources are received.

A corpus for ontology construction is determined at 204. According to various embodiments, the corpus may include information specific to a particular context. For instance, a context may identify a particular organization, factory building, machine type, and/or component type. A corpus may include information such as documents describing industry standards, catalogues of parts, bills of materials, technical manuals, manuals describing standard operating procedures, service records, warranty records, and the like. Such information is often stored in a digital and text-based format but is often relatively unstructured. The corpus may be determined by performing a search of a storage location. Alternatively, or additionally, user input may assist in identifying relevant documents.

A determination is made at 204 as to whether to initialize the failure mode ontology. According to various embodiments, the determination may be made based on whether initialization data is available. For example, in an established industry such as the automotive industry, standard failure modes may be identified and associated with attributes such as keywords.

If the determination is made to initialize the failure mode ontology, then the failure mode ontology is initialized with failure mode initialization data at 208. For example, a failure mode ontology may be seeded with predetermined failure modes and their various attributes. This initialized model may then be used as a basis for the concepts determined at 212 as well as the linkages between terminology determined at 210 and concepts determined at 212.

Domain terminology is determined based on the corpus at 210. According to various embodiments, determining domain terminology may involve identifying domain-specific terms. Various approaches to determining domain terminology may be used. For example, relevant terms can be determined by calculating the term-frequency/inverse document-frequency values for terms that appear in a particular corpus. As another example, relevant terms can be determined by applying the C-value/NC-value method. The C-value enhances a statistical measure of frequency of occurrence for term extraction by aiding in the identification of multi-word, nested terms. The NC-value then provides for the extraction of term context words (i.e., words that tend to appear with terms) and the incorporation of information from term context words to the extraction of terms. As yet another example, synonyms may be identified by, for instance, identifying words that commonly substitute for one another. As still another example, less relevant words such as stop words may be identified and removed.

An ontology for the domain terminology is determined at 212. In some implementations, determining an ontology may involve training a word2vec model. The word2vec model may be a neural network that takes as its input the corpus identified at 208 and produces a multi-dimensional vector space with unique words in the corpus being assigned a corresponding vector in the space. Word vectors are positioned in the vector space such that words that share common contexts in the corpus are located close to one another in the space.

In some embodiments, determining an ontology for the domain may involve performing one or more pre-processing operations on the text. For example, words may be stemmed. As another example, one or more stop words may be removed.

In particular embodiments, the word2vec model may represent not only individual words, but also phrases, which may also be known as N-grams. For instance, a recurring combination of two, three, four, or more words may map to a particular vector within a vector space.

The ontology is stored at 214. According to various embodiments, the ontology may be stored on a storage device so that it can be applied to a data source to identify words, phrases, and concepts in the ontology within the data source. For instance, the ontology may be stored as a word2vec model that may then be applied to a data source to determine a vectorization of the data source.

Figure 3:
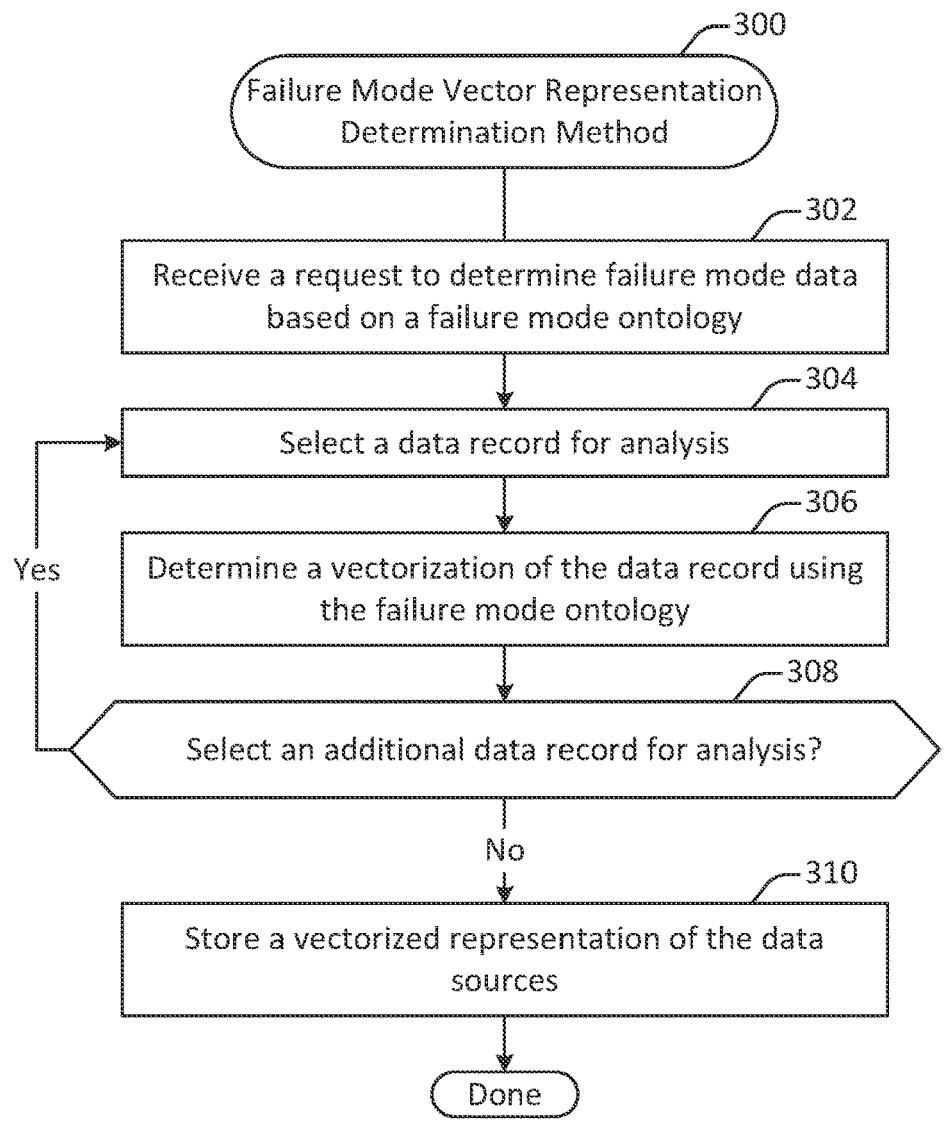
FIG. 3 illustrates a method for determining a failure mode vector representation, performed in accordance with one or more embodiments.

FIG. 3 illustrates a method 300 for determining a failure mode vector representation, performed in accordance with one or more embodiments. The method 300 may be performed on any suitable computing device to apply the ontology determined in the method 200 to one or more data sources.

A request to determine failure mode data based on a failure mode ontology is received at 302. In some implementations, the request may be generated as discussed with respect to the operation 104 shown in FIG. 1. The request may identify one or more data sources to which to apply the failure mode ontology generated as discussed with respect to the method 200 shown in FIG. 2.

A data record is selected for analysis at 304. In some implementations, the data records analyzed in the method 300 may include some or al of the data sources used to construct the ontology in the method 200 shown in FIG. 2. Alternatively, or additionally, other data sources may be used.

In some embodiments, the method 300 may be applied to data records that are particularly indicative of mechanical component or machine failure, such as maintenance and/or warranty records. Maintenance and/or warranty records may include information about scheduled or unscheduled maintenance or replacement of machines or components within machines. Such records may include various types of information, For example, records may include a date and/or time of service. As another example, records may identify a machine type or component type associated with a machine or component. As another example, records may identify a particular machine or component (e.g., by serial number). A machine or component may be identified in a service record if it failed, was replaced, was repaired, or was otherwise referenced in a maintenance report. As yet another example, records may identify symptoms of a problem, defects identified during maintenance, and/or remedies applied to address the problem. As still another example, records may identify machine or component downtime, cost associated with repairs, or other such information.

In some embodiments, maintenance and/or warranty records may be embodied in unstructured data such as text. Alternatively, or additionally, records may be semi-structured. For instance, maintenance records may include a number of fields such as "Machine serial number", "Symptoms", "Date", and "Remedy", with the content of some or all of those fields being unstructured text. As still another possibility, some portion of maintenance records may be structured. For instance, fields such as date and serial number may be structured (e.g., in a database system) while other fields may be in a text-based format.

In some embodiments, a data record may be, for instance, a particular maintenance record. The data record may include one or more text components. Additionally, the data record may include metadata such as a date, a component identifier, and the like. Thus, a single data record may potentially include more than one vectorization, for instance corresponding to different text fields associated with the record.

A vectorization of the data source is determined at 306 using the failure mode ontology. According to various embodiments, the vectorization may be determined by applying the failure mode ontology to the data record. For instance, a trained word2vec model may be applied to text included in the data record to determine a vector representation of all or a portion of the data source.

In some implementations, the vector representation may include potentially many vectors for a given data record. For instance, different words within the data record may be represented as different vectors into a multi-dimensional vector space.

A determination is made at 308 as to whether to select an additional data source for analysis. According to various embodiments, data sources may continue to be selected until all data sources identified at 302 have been analyzed. Data sources may be identified in any suitable order, in sequence or in parallel.

A vectorized representation of the data source is stored on a storage device at 310. According to various embodiments, the vectorized representation may be a structured data set that includes a vector corresponding to a particular data source. The structured data set may also include, for a given observation, metadata such as a date, a component identifier, and the like.

Figure 4:
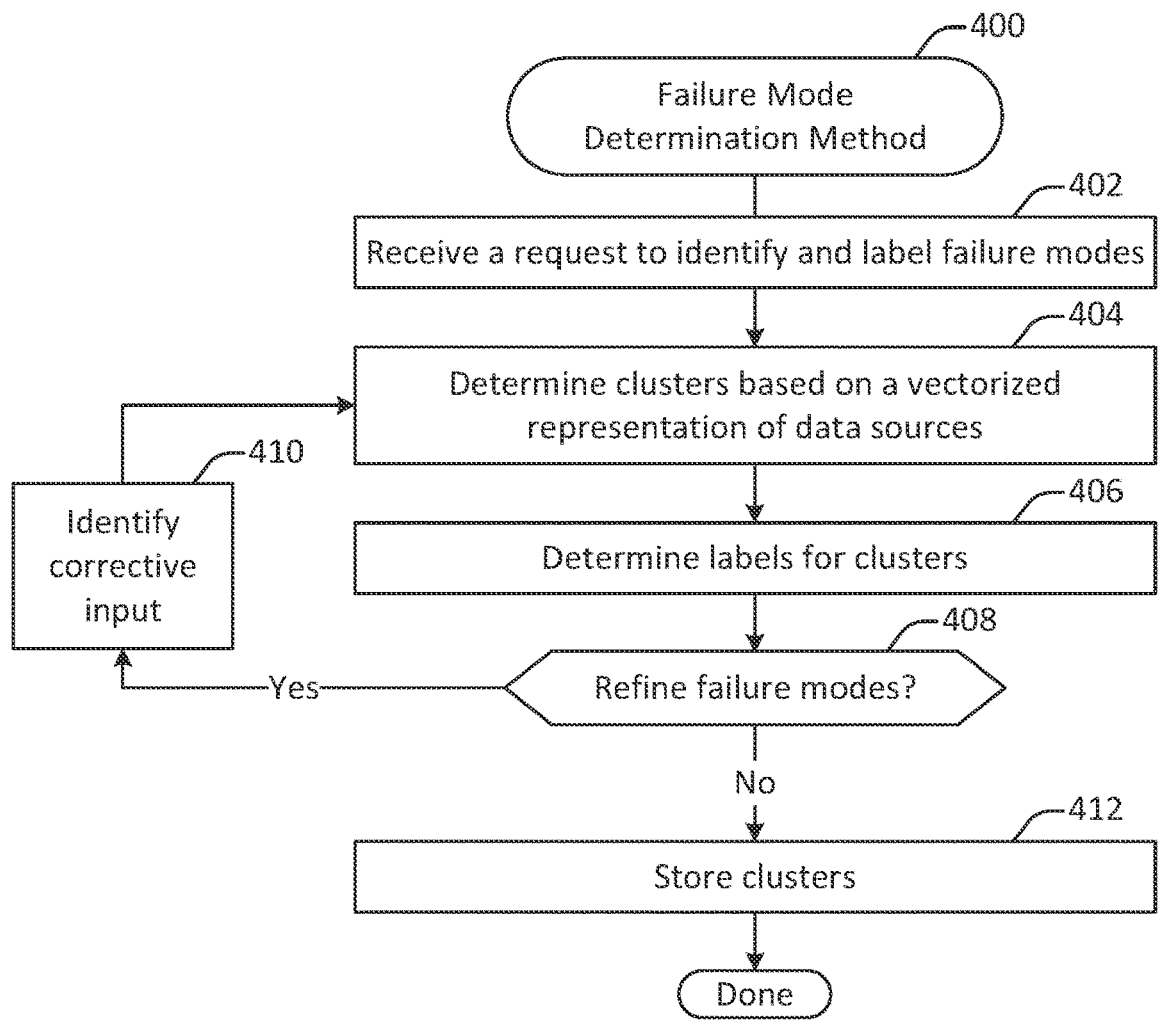
FIG. 4 illustrates a method for determining failure modes, performed in accordance with one or more embodiments.

FIG. 4 illustrates a method 400 for determining failure modes, performed in accordance with one or more embodiments. The method 400 may be performed on any suitable computing device to determine a set of failure modes reflected in the corpus.

A request to identify and label failure modes is received at 402. According to various embodiments, the request may be generated as discussed with respect to operation 106 shown in the method 100 in FIG. 1.

Clusters are determined at 404 based on a vectorized representation of data sources. In some implementations, the clusters may be determined by applying an unsupervised machine learning model to the vectorized data sources. For instance, a k-means clustering algorithm may be applied to the vectorized representations produced by applying a word2vec word embedding to documents such as maintenance records that include textual description of mechanical component failures. Other examples of clustering approaches may include, but are not limited to: mean-shift clustering, density-based spatial clustering of applications with noise, and agglomerative hierarchical clustering. As discussed with respect to the method 200 shown in FIG. 2, text may be pre-processed, for instance by applying a stemmer, removing stopwords, or performing other techniques common to natural language processing.

In particular embodiments, the output of clustering may include a mapping from vector space to cluster. For instance, particular vectors as defined by a word2vec model may be mapped to particular clusters via a correspondence relationship.

In some embodiments, determining cluster may involve determining one or more hierarchical relationships between clusters. According to various embodiments, determining the hierarchy may involve identifying a taxonomic structure of the concept identified at 212. For instance, an unsupervised hierarchical clustering method may be used to organize the concepts. For example, patterns that should indicate a sub- or supersumption relationship may be identified. Patterns like "X, that is a Y" or "X is a Y" indicate that X is a subclass of Y.

Labels for the clusters are determined at 406. In some implementations, labels may be determined by identifying the most common terms within a cluster. Alternatively, or additionally, one or more labels may be determined based on the vector representation. For instance, a cluster may be composed of a set of vectors from the word2vec model. Then, a cluster mean may be determined as a derived vector by, for instance, averaging the vectors that make up the cluster. Next, a word or words that the derived vector is pointing to or is pointing near may be determined.

In some embodiments, standard failure modes may be used to identify one or more terms. For example, terms associated with industry standard failure modes may be compared with words or vectors within the cluster to identify which standard failure mode is represented by the cluster. Then, one or more standard terms associated with the standard failure mode may be used to label the cluster.

A determination is made at 408 as to whether to refine failure modes. In some implementations, the determination may be made based on user input. For instance, a subject matter expert may review the failure modes and decide whether to refine them.

If the determination is made at 408 to refine failure modes, then corrective input is identified at 410. In some implementations, the corrective input may include manually provided information such as records that belong in the same cluster, cluster names, and the like. The information may then be used in operations 404 and/or 406 to refine the process. For example, the corrective input may be treated as a constraint. As another example, the corrective input may be treated as ground truth data for applying a supervised machine learning model in operations 404 and/or 406.

If instead the determination is made at 408 not to refine failure modes, then the clusters are stored at 412. In some implementations, the clusters may be stored in a manner that provides a correspondence between a vectorization and a cluster. The clusters may be stored in conjunction with the ontology determined as discussed with respect to the method 200 in FIG. 2. In this way, a novel data record may be quickly vectorized and assigned a failure mode by applying first the ontology and then determining one or more appropriate clusters based on the correspondence.

Figure 5:
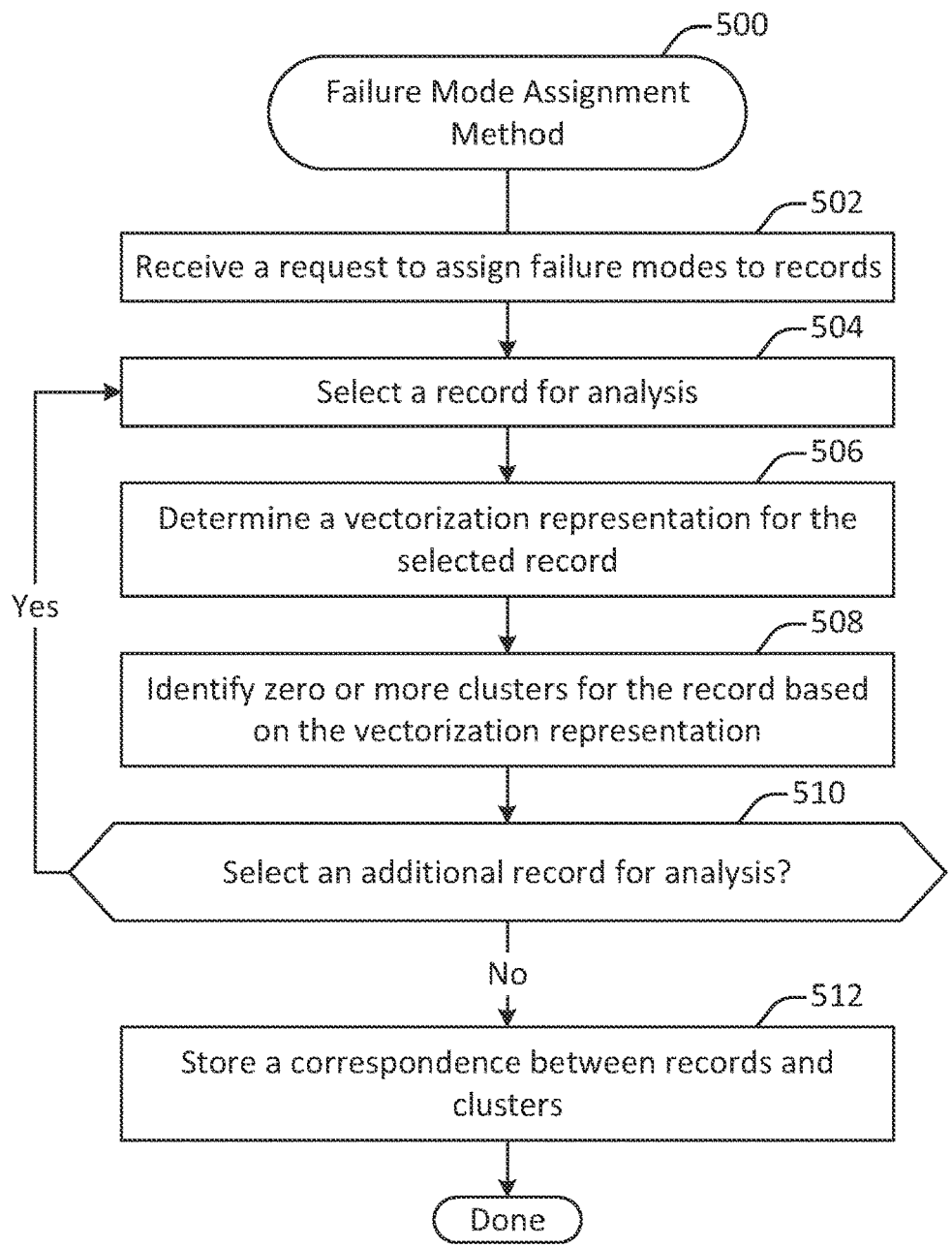
FIG. 5 illustrates a method for assigning failure modes to records, performed in accordance with one or more embodiments.

FIG. 5 illustrates a method 500 for assigning records to failure modes, performed in accordance with one or more embodiments. The method 500 may be performed on any suitable computing device to assign failure modes to records.

A request to assign failure modes to records is received at 502. According to various embodiments, the request may be generated as discussed with respect to operation 108 shown in FIG. 1.

A record is selected for analysis at 504. In some implementations, the record may be a maintenance record, which may or may not be indicative of one or more failure modes. For example, an instance of scheduled maintenance may in some instances not identify any mechanical component failures. However, in other instances a scheduled or unscheduled maintenance incident may be related to a mechanical component failure. Indeed, in some situations a single maintenance incident may correspond to more than one type of failure.

According to various embodiments, the records selected for analysis may include some or all of the records used to build the ontology and/or determine the clusters. Alternatively, or additionally, different records may be selected for analysis.

A vectorization representation for the selected record is determined at 506. In some implementations, the vectorized representation may be predetermined, for instance when applying the ontology to the selected record as part of the method 300 shown in FIG. 3. Alternatively, the vectorized representation may be determined at 506. For example, the vectorized representation may be determined by processing the selected record at 506 by applying the ontology to the selected record.

Zero or more clusters are identified for the record based on the vectorization representation at 508. In some implementations, the clusters may be identified by determining which if any of the clusters identified in the method 400 shown in FIG. 4 match the combination of vectors included in the vector representation.

In some embodiments, the cluster for a record may be determined as part of the clustering process discussed with respect to FIG. 4. Alternatively, a record may be assigned to one or more clusters during the operation of the method 500 shown in FIG. 5, for instance if the record was not included in the clustering analysis performed in FIG. 4.

A determination is made at 510 as to whether to select an additional record for analysis. In some implementations, records in a collection may be analyzed in sequence, in parallel, or in any suitable order.

If it is determined not to select an additional record for analysis, then at 512 a correspondence between records and clusters is stored on a storage device. The correspondence may identify for a particular record which, if any, of the clusters correspond to the record.

Figure 6:
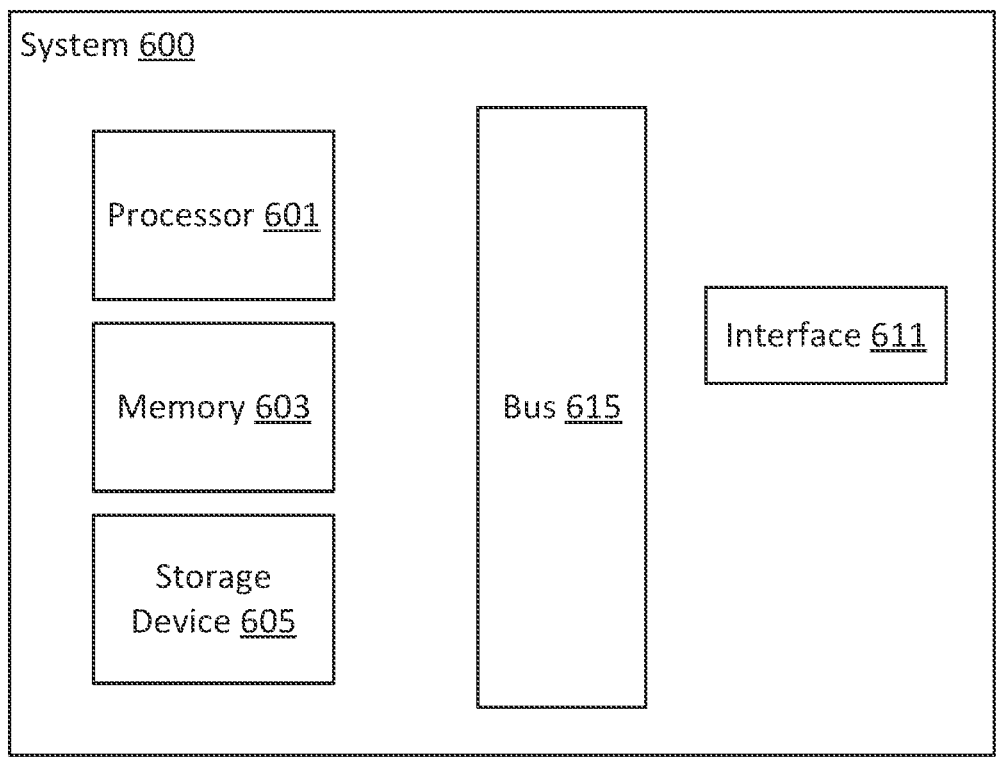
FIG. 6 illustrates one example of a computing device, configured in accordance with one or more embodiments.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as implementing a prediction model, performing drift detection, and/or updating a prediction model. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user. In some embodiments, the computing device 600 may be implemented in a cloud computing environment.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   determining via a processor a word embedding based on a plurality of text documents, the text documents including a plurality of maintenance records characterizing maintenance of mechanical components;
   determining via a processor a plurality of vector representations corresponding to the plurality of maintenance records and based on a word embedding;
   determining via a processor a plurality of clusters based on the plurality of vector representations, the plurality of clusters corresponding to a plurality of failure modes, each of the plurality of clusters including one or more of the text documents;
   determining respective labels for the plurality of clusters based on statistical analysis of the plurality of vector representations; and
   storing on a storage device a correspondence between the plurality of text documents and the plurality of failure modes.

2. The method recited in claim 1, wherein the statistical analysis includes determining a plurality of word frequencies.

3. The method recited in claim 1, the method further comprising:
   determining the word embedding at least in part based a predetermined data set identifying the plurality of failure modes.

4. The method recited in claim 1, wherein the word embedding is a word2vec model.

5. The method recited in claim 1, wherein a designated vector representation of the plurality of vector representations includes a plurality of vectors determined based on a designated text document of the text documents corresponding with a designated mechanical component of the mechanical components.

6. The method recited in claim 5, the method further comprising:
   identifying a designated one of the plurality of failure modes for the mechanical component by identifying a designated one of the clusters in which the designated vector representation is included.

7. One or more non-transitory computer readable media having instructions stored thereon for performing a method, the method comprising:
   determining via a processor a word embedding based on a plurality of text documents, the text documents including a plurality of maintenance records characterizing maintenance of mechanical components;
   determining via a processor a plurality of vector representations corresponding to the plurality of maintenance records and based on a word embedding;
   determining via a processor a plurality of clusters based on the plurality of vector representations, the plurality of clusters corresponding to a plurality of failure modes, each of the plurality of clusters including one or more of the text documents;

determining respective labels for the plurality of clusters based on statistical analysis of the plurality of vector representations; and storing on a storage device a correspondence between the plurality of text documents and the plurality of failure modes.

8. The one or more non-transitory computer readable media recited in claim 7, wherein the statistical analysis includes determining a plurality of word frequencies.

9. The one or more non-transitory computer readable media recited in claim 7, the method further comprising:
determining the word embedding at least in part based a predetermined data set identifying the plurality of failure modes.

10. The one or more non-transitory computer readable media recited in claim 7, wherein the word embedding is a word2vec model.

11. The one or more non-transitory computer readable media recited in claim 7, wherein a designated vector representation of the plurality of vector representations includes a plurality of vectors determined based on a designated text document of the text documents corresponding with a designated mechanical component of the mechanical components.

12. The one or more non-transitory computer readable media recited in claim 11, the method further comprising:
identifying a designated one of the plurality of failure modes for the mechanical component by identifying a designated one of the clusters in which the designated vector representation is included.

13. A system comprising:
one or more processors configured to:
determine a word embedding based on a plurality of text documents, the text documents including a plurality of maintenance records characterizing maintenance of mechanical components,
determine a plurality of vector representations corresponding to the plurality of maintenance records and based on a word embedding,
determine a plurality of clusters based on the plurality of vector representations, the plurality of clusters corresponding to a plurality of failure modes, each of the plurality of clusters including one or more of the text documents;
determine respective labels for the plurality of clusters based on statistical analysis of the plurality of vector representations; and
a storage device configured to store a correspondence between the plurality of text documents and the plurality of failure modes.

14. The system recited in claim 13, wherein the statistical analysis includes determining a plurality of word frequencies.

15. The system recited in claim 13, wherein the one or more processors are further operable to determine the word embedding at least in part based a predetermined data set identifying the plurality of failure modes.

16. The system recited in claim 13, wherein the word embedding is a word2vec model.

17. The system recited in claim 13, wherein a designated vector representation of the plurality of vector representations includes a plurality of vectors determined based on a designated text document of the text documents corresponding with a designated mechanical component of the mechanical components.

18. The system recited in claim 17, wherein the one or more processors are further operable to identify a designated one of the plurality of failure modes for the mechanical component by identifying a designated one of the clusters in which the designated vector representation is included.

19. A method comprising:
determining via a processor a word embedding based on a plurality of text documents, the text documents including a plurality of maintenance records characterizing maintenance of mechanical components;
determining via a processor a plurality of vector representations corresponding to the plurality of maintenance records and based on a word embedding, wherein a designated vector representation of the plurality of vector representations includes a plurality of vectors determined based on a designated text document of the text documents corresponding with a designated mechanical component of the mechanical components;
determining via a processor a plurality of clusters based on the plurality of vector representations, the plurality of clusters corresponding to a plurality of failure modes, each of the plurality of clusters including one or more of the text documents; and
storing on a storage device a correspondence between the plurality of text documents and the plurality of failure modes.

20. The method recited in claim 19, the method further comprising:
determining the word embedding at least in part based a predetermined data set identifying the plurality of failure modes.

21. The method recited in claim 19, wherein the word embedding is a word2vec model.

22. The method recited in claim 19, the method further comprising:
identifying a designated one of the plurality of failure modes for the designated mechanical component by identifying a designated one of the clusters in which the designated vector representation is included.

23. One or more non-transitory computer readable media having instructions stored thereon for performing a method, the method comprising:
determining via a processor a word embedding based on a plurality of text documents, the text documents including a plurality of maintenance records characterizing maintenance of mechanical components;
determining via a processor a plurality of vector representations corresponding to the plurality of maintenance records and based on a word embedding, wherein a designated vector representation of the plurality of vector representations includes a plurality of vectors determined based on a designated text document of the text documents corresponding with a designated mechanical component of the mechanical components;
determining via a processor a plurality of clusters based on the plurality of vector representations, the plurality of clusters corresponding to a plurality of failure modes, each of the plurality of clusters including one or more of the text documents; and
storing on a storage device a correspondence between the plurality of text documents and the plurality of failure modes.

24. The one or more non-transitory computer readable media recited in claim 23, the method further comprising:
determining the word embedding at least in part based a predetermined data set identifying the plurality of failure modes.

25. The one or more non-transitory computer readable media recited in claim 23, wherein the word embedding is a word2vec model.

26. The one or more non-transitory computer readable media recited in claim 23, the method further comprising:
identifying a designated one of the plurality of failure modes for the mechanical component by identifying a designated one of the clusters in which the designated vector representation is included.

27. A system comprising:
one or more processors configured to:
determine a word embedding based on a plurality of text documents, the text documents including a plurality of maintenance records characterizing maintenance of mechanical components,
determine a plurality of vector representations corresponding to the plurality of maintenance records and based on a word embedding, wherein a designated vector representation of the plurality of vector representations includes a plurality of vectors determined based on a designated text document of the text documents corresponding with a designated mechanical component of the mechanical components,
determine a plurality of clusters based on the plurality of vector representations, the plurality of clusters corresponding to a plurality of failure modes, each of the plurality of clusters including one or more of the text documents; and
a storage device configured to store a correspondence between the plurality of text documents and the plurality of failure modes.

28. The system recited in claim 27, wherein the one or more processors are further operable to determine respective labels for the plurality of clusters based on statistical analysis of the plurality of vector representations, and wherein the statistical analysis includes determining a plurality of word frequencies.

29. The system recited in claim 27, wherein the one or more processors are further operable to determine the word embedding at least in part based a predetermined data set identifying the plurality of failure modes.

30. The system recited in claim 27, wherein the word embedding is a word2vec model.

31. The system recited in claim 27, wherein the one or more processors are further operable to identify a designated one of the plurality of failure modes for the designated mechanical component by identifying a designated one of the clusters in which the designated vector representation is included.

\* \* \* \* \*